May 8, 1923.
A. W. BUCK
1,454,152
DENTAL FILM MOUNT
Filed Jan. 7, 1922
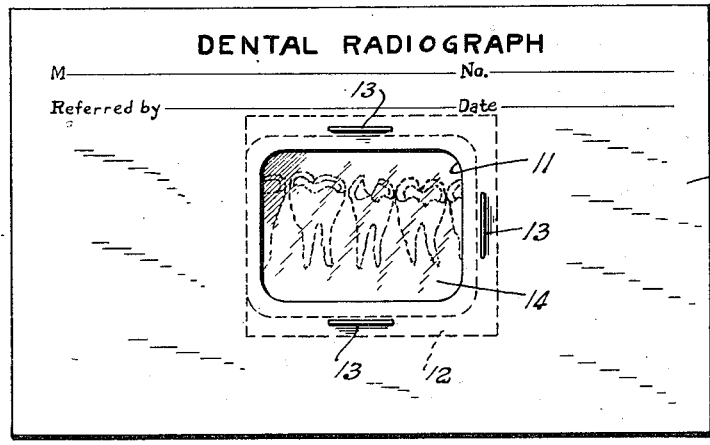
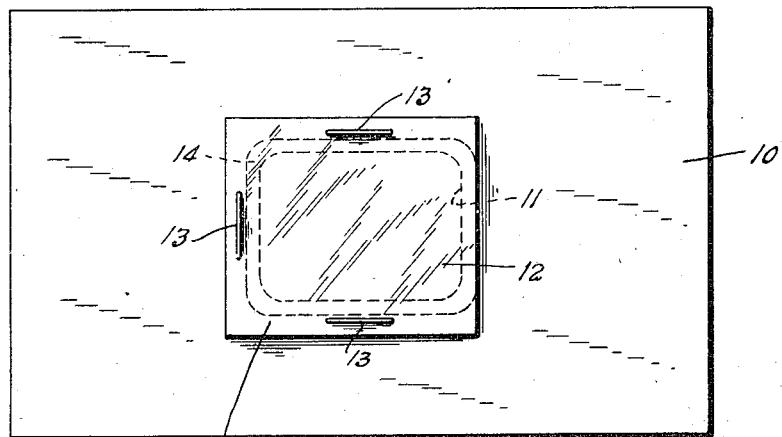
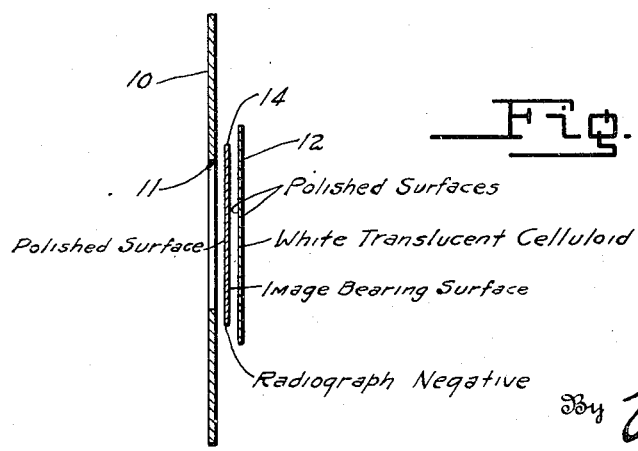
Inventor
Arthur W. Buck
By Watson E. Coleman
Attorney Patented May 8, 1923.

1,454,152

UNITED STATES PATENT OFFICE.

ARTHUR W. BUCK, OF ST. LOUIS, MISSOURI.

DENTAL FILM MOUNT.

Application filed January 7, 1922. Serial No. 527,709.

*To all whom it may concern:*

Be it known that I, ARTHUR W. BUCK, a citizen of the United States, residing at St. Louis, State of Missouri, have invented certain new and useful Improvements in Dental Film Mounts, of which the following is a specification, reference being had to the accompanying drawings.

This invention relates to means for supporting or mounting X-ray photographs or radiographs, and particularly to a mount for dental X-ray films.

These dental radiographs are made on very thin photographic films and these relatively small rectangular films are commonly mounted upon a support of cardboard or like material, the central portion of which support is cut away so as to form an aperture slightly smaller than the film to be displayed, and back of this aperture there is disposed a small rectangular sheet of celluloid or like material which has one of its faces frosted or roughened so as to diffuse light but prevent objects from being seen through it or is relatively translucent. This back is attached to the cardboard mount by means of staples on three of its margins so that the photographic film with the radiograph thereon may be readily inserted into the space between the back and the margin of the opening in the card mount. The celluloid back has a smooth and highly polished surface and a roughened or frosted surface, and it is common practice to dispose the frosted or roughened surface so as to face the slip of gelatin film having thereon the radiograph.

The film has its dull or image-bearing surface disposed in contact with the frosted or roughened face of the back, the polished surface of the radiographic film being disposed outward. Thus the image-bearing surface of the film is protected by the back and by the glossy or unsensitized face of the film. The frosted celluloid back is open to two objections. The frosted or roughened face of the back has a granular effect when the radiograph is viewed by holding it up to strong light. This frosted or roughened surface of the celluloid back somewhat obliterates and confuses the delicate details of the radiograph. Furthermore, the frosted or roughened surface of the celluloid back is very easy to scratch or mar, and again this frosted or roughened surface is very liable to scratch or mar the picture-bearing face of the radiograph film when the latter is inserted in place within the mount, thus also tending to obliterate or confuse detail in the radiograph.

The object of my invention is to overcome these three objections by the provision of a celluloid back or back of like nature having both its outer and inner faces highly polished so that neither of these faces is liable to become scratched or marred and so that the face confronting the image-bearing face of the radiograph film will not be scratched or marred, this celluloid back being formed of translucent celluloid known to the trade as "opal" celluloid, which has practically no visible structure, or in other words which has no "grain" and which, therefore, cannot confuse the fine details of the dental radiograph.

My invention is illustrated in the accompanying drawings, wherein:—

Figure 1 is a front view of a dental radiograph constructed in accordance with my invention;

Figure 2 is a rear elevation thereof;

Figure 3 is diagrammatic section through the mount showing the mounting card, the radiograph negative and the celluloid back or window separated from each other.

Referring to these drawings, 10 designates a mounting card which may be made of pasteboard, cardboard, celluloid or any other suitable material and which carries printed upon it spaces for the necessary record with regard to the radiograph. This card or support 10 may be black, gray, or any other desired color. The card 10 is cut away at its center, as at 11, to provide a rectangular or other shaped opening. Disposed behind this opening 11 is a back or window 12 of thin sheet celluloid which is larger in area than the opening and which is attached upon three of its margins to the margins of the opening by means of the staples 13 or other fastening means. It is the formation of this back of celluloid 12 which is particularly the subject matter of this invention. This celluloid is what is known as "opal" celluloid, that is it is translucent and both its faces are highly polished. This celluloid is ordinarily cream color or white and when light is transmitted through this back the light is uniformly diffused and there is an entire absence of apparent grain or structure of any kind. The radiographic film 14 is disposed in front of this back or window 12 and between the inner face of the card 10 and the front face of the window or back 12, with the image-bearing face of the radiographic film on the inside or confronting the back 12. Thus this image-bearing face is entirely protected on one side by the outside face of the radiographic film itself and on the inside by the back 12.

By reason of the fact that the back 12 is highly polished on both faces, there is less liability of this back being scratched or marred either through handling or through the insertion or withdrawal of the radiographic film. Furthermore, inasmuch as that surface of the back 12 which faces the image-bearing surface of the film 14 confronts this image-bearing surface, it is obvious that there will be very much less chance of either of the image bearing surfaces of the film being scratched or marred. Furthermore, inasmuch as neither surface of the back 12 is roughened or frosted in order to render it translucent, there will be no chance of any confusion or obliteration of the fine details of the radiograph. It will be obvious that this is particularly necessary in radiographs of small size, as it is particularly necessary that these radiographs should be clear and distinct and correct in every detail in order for the dentist to make a correct diagnosis of the case. Not only does the particular variety of celluloid which I have mentioned, namely the "opal" celluloid, have the advantageous characteristics before referred to, but inasmuch as it is cream color or very nearly white as distinguished from the very light brown or yellowish brown of the frosted face celluloid, a much better illumination of the radiograph is secured than is possible with the frosted face celluloid.

The word "translucent" as used throughout the specification and claims is intended to mean that the strip of celluloid 12 permits the passage of light but is not transparent and, therefore, does not permit objects to be seen through the celluloid. I am aware of the fact that it has been proposed to use gelatin as a support for a dental radiograph negative, but gelatin is open to many objections. It responds so readily to humidity that it will cause the dental film mount to buckle or curl an undesirable extent. On the other hand, under low temperature gelatin is apt to become brittle and to break up if bent to any extent. Furthermore, if the dental film negative is not washed entirely free from hypo, which is frequently the case, the film will sweat and this moisture on the film is liable to cause the film to stick to the gelatin. Again, it is almost impossible to handle sheet gelatin without leaving finger marks or soil marks of different kinds which cannot be successfully cleaned off and which, of course, tend to obliterate or render difficult of observation the finer details of the negative. The sheet gelatin almost invariably contains minute "air bells" as well as other defects which interfere with the examination of the film. Celluloid is open to none of the defects above stated and it may at all times be washed and cleansed from any trace of dirt.

Of course, it will be understood that a single card or other support may have any number of openings in it for the display of a number of different radiographs and that these openings may be of any desired shape and that any suitable means may be used for holding the back to the mounting card 10.

I claim:—

1. A mount for radiographic films comprising a support of thin material having a central opening behind which the film is adapted to be disposed, a back larger than the central opening and attached to the back of the support along three of its margins, said back being formed of a thin strip of translucent celluloid having both of its faces highly polished, said strip of celluloid being white in color.

2. The combination with a support having a central opening and a back attached to the support and extending over said opening and composed of translucent celluloid having highly polished opposite faces, said back being attached along three of its margins to the support, of a radiograph negative flexible celluloid film having an image-bearing surface and a glossy surface, the radiograph negative being disposed between the support and said back with its image-bearing surface confronting the highly polished surface of the back, the radiograph negative film having an area greater than the area of said opening in the support but smaller than the area of the back.

In testimony whereof I hereunto affix my signature.

ARTHUR W. BUCK.